Sept. 5, 1933.  R. E. CHOATE  1,925,654
DUMP WAGON
Filed June 3, 1929   3 Sheets-Sheet 1
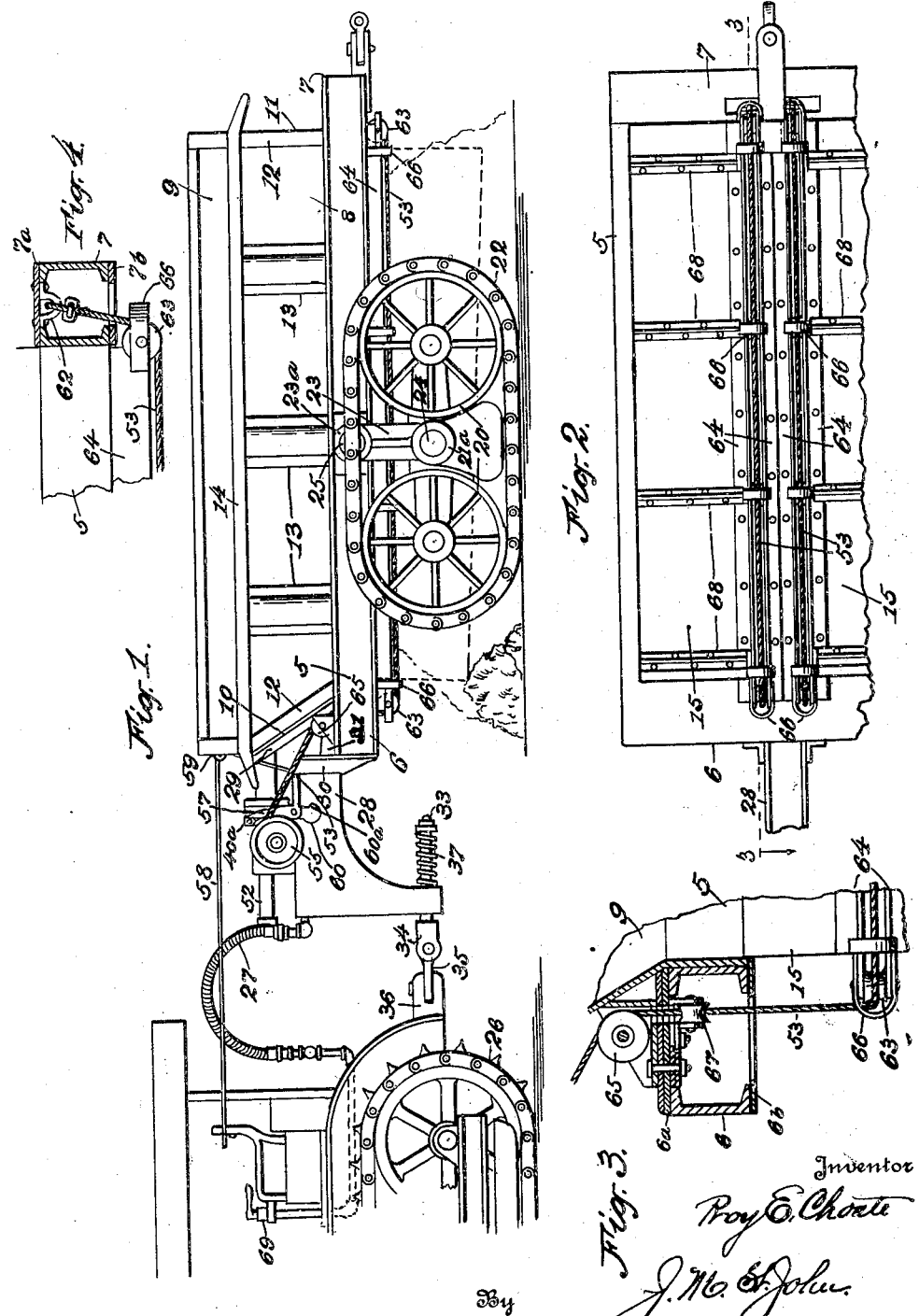
Inventor
Roy E. Choate
By J. M. St. John
Attorney

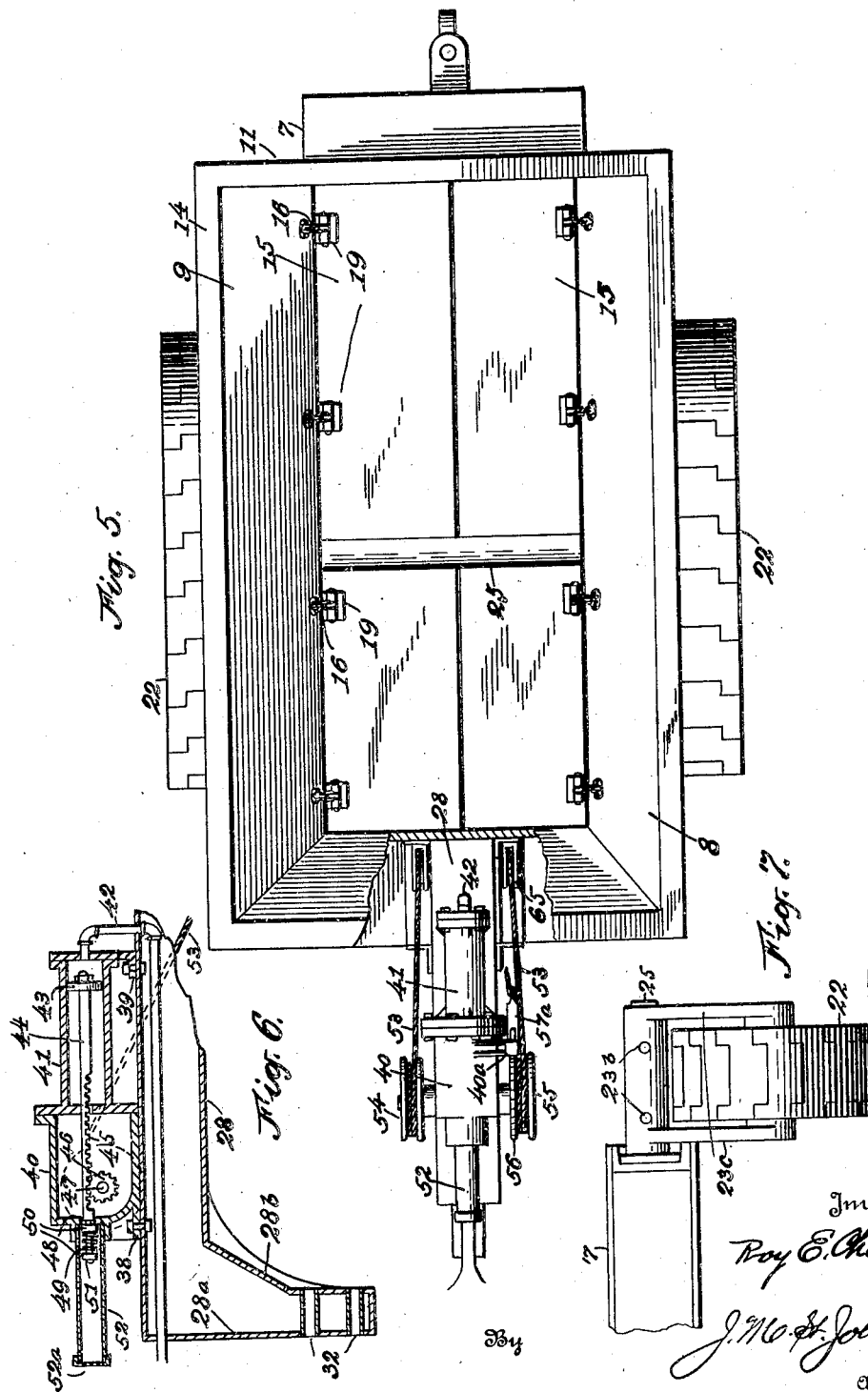

Sept. 5, 1933.    R. E. CHOATE    1,925,654
DUMP WAGON
Filed June 3, 1929    3 Sheets-Sheet 3
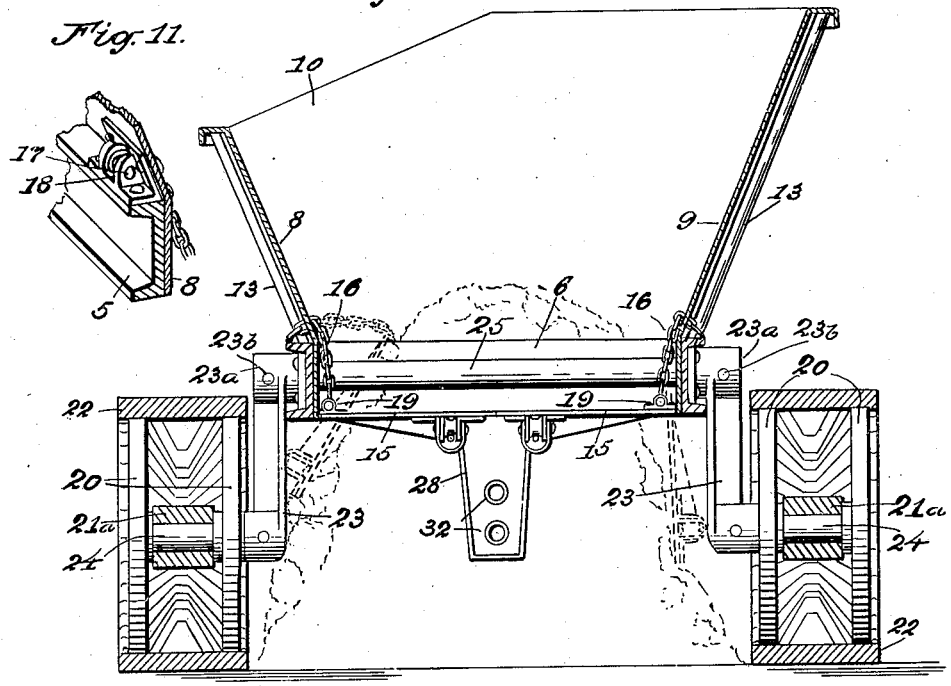
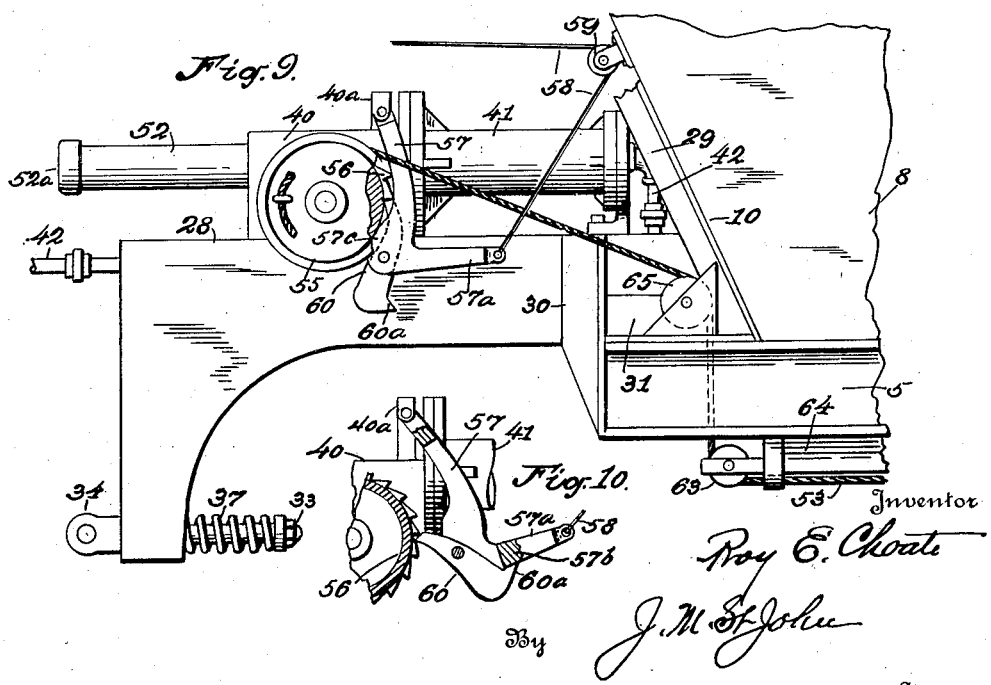
Inventor
Roy E. Choate
By J. M. St. John
Attorney Patented Sept. 5, 1933

1,925,654

UNITED STATES PATENT OFFICE 1,925,654

DUMP WAGON

Roy E. Choate, Cedar Rapids, Iowa

Application June 3, 1929. Serial No. 367,903

2 Claims. (Cl. 298—35)

This invention relates to dump wagons of a heavy-duty type in which the load is dropped through the bottom of the load-containing body normally closed by trap-doors which are tripped and swing downwardly to dump the load. The body, instead of being carried on wheels of the wagon or truck type, is mounted on a pair of track-laying devices adapted for the easy transportation of heavy loads over soft, rough, or otherwise difficult terrain.

One of the main objects of the invention is to provide for the dragging of the dump wagon and the handling of its load almost wholly by a tractor of the track-laying type, the adjustment of the trap-doors and the dumping of the load being effected by hydraulic means in connection with the tractor, and by the exercise of slight manual labor.

Another object is provision for easy and convenient loading of the wagon, an increase in the capacity of the body, and such a construction as will positively cause the body, after the dumping of a substantially full load, and as drawn forward, to scrape off and partially level the pile of dumped material.

A further object is to provide a very simple mounting of the body on the track-laying supports therefor, which supporting and transporting elements, for the purposes of this application, may be briefly designated as crawlers.

Another object is to provide means for connecting the trap-doors with the body, which, while preventing dislocation of the doors, will nevertheless allow them great freedom of movement in their dumped positions, and thereby permit them to rise and tilt loosely to avoid rocks or other obstructions as the wagon moves forward after dumping.

Another object is to provide simple and efficient means for restoring the trap-doors to their normal, load-supporting position after dumping, and to retain the doors effectively in such restored position.

Further objects are found in improved trip mechanism for the trap-doors; hitch mechanism to connect the wagon to the pulling tractor; and other details of construction fully set forth in the description following.

In the accompanying drawings, forming a part of this specification, Fig. 1 is a side elevation of a dump-wagon embodying the invention. Fig. 2 is a fragmentary bottom view of the same, showing the bottom of the main frame and body, the trap-doors and the means for elevating the same. Fig. 3 is a fragmentary sectional view taken on the line 3—3 of Fig. 2, showing the lifting mechanism for one of the trap-doors at the front end, the door being depressed. Fig. 4 is a fragmentary sectional view on the same line, showing the lifting sling and its anchorage at the rear end of a door. Fig. 5 is a top view of the dump wagon complete. Fig. 6 is a central, vertical section of the wagon tongue and the hydraulic hoist for the trap-doors. Fig. 7 is a rear elevation showing a modification in the mounting of the body on the creeper and a fragment of the rear sill and body. Fig. 8 is a transverse section of the wagon, partly on the line of the center of the arched body-supporting structure connecting with the crawlers. Fig. 9 is an enlarged side elevation showing the trap-door hoist and its connection with a door. Fig. 10 shows details of the hoist detent and trip mechanism. Fig. 11 shows in perspective details of the anchorage for the chains connecting the trap-doors with the body.

The load-carrying body of the wagon comprises a substantially rectangular bottom frame, a superstructure attached to the frame, and a pair of trap-doors hung at the inner sides of the frame, to be supported for carrying the load, and to swing downwardly and outwardly in dumping the load. The frame comprises a a pair of side-sills 5, preferably of structural channel steel, a connecting front cross-still 6 and a connecting rear sill 7. In practice the cross-sills are straight, with normally level bottoms substantially flush with the bottoms of the side sills. A simple form of cross-sill is indicated in Figs. 3 and 4, a pair of channels being connected by a top-plate 6a or 7a, with bottom-plates 6b and 7b, respectively, to form a box-like hollow structure, very substantial and rigid. The mechanical connection of the parts by riveting, welding, or otherwise, is so well and generally known as to require no special description.

To the inner sides of the frame is secured a hopper-like superstructure to contain the load. This is of sheet steel, with flaring sides 8 and 9, an inclined front end 10 and a vertical rear end 11. Reinforcing angles 12 make the corners secure and rigid, and the sides are stiffened by vertically disposed reinforcing ribs of corrugated steel, 13. Protective stiffening flanges or rolls 14 give proper rigidity to the top of the body all around. The side 8 is carried up to a height convenient for loading (usually by power-operated shovels, not shown). The other side 9 is carried up considerably higher, so as to give abundant carrying capacity to the wagon body. The portions of the superstructure below the tops of the sill stand vertically conforming to the inner faces of the sill members, as shown in Fig. 8.

Inside the main frame is hung a pair of trap-doors 15 to form a complete bottom for the load receptacle when in their closed position. The outer edge of each door is suspended from the sides of the body, over the top of the side sill by chains 16. The chains pass through holes in the sides of the body, and to prevent undue strain on the sheet metal sides are preferably anchored at their ends to the sills. The anchorage indicated in Fig. 8 is by welding the end links to the sill. Preferably, however, the terminal links of the chains are connected, as by pins 17 to anchor-blocks 18 set in the angle between the sides of the body and top of the sills, and secured thereto, as by riveting or welding (see Fig. 11). The pins may be detachable, and thus permit the removal of the chains for any purpose whatever. The other ends of the chains connect in a similar way with anchor blocks 19 riveted to the flat steel plates of which the doors are mainly composed. Lifting and supporting mechanism for the trap-doors will be described hereafter.

The crawlers for the transportation of the wagon body and its load are of a familiar type, each having a pair of aligned and separated apron carriers 20 mounted turnably at ends of a connecting reach 21. The apron 22 of each crawler is linked and preferably of the type that is self-stiffening in the space between the carrier wheels. These crawlers run very easily, and as is well known, can travel over very rough ground, and support a heavy load on soft and treacherous soil.

The mounting of the wagon body on the crawlers is very simple. To the outer face of each side sill is rigidly secured a hanger 23 similar to a stout crank-arm. Rigidly connecting with the lower end of each hanger is a short, outwardly extending axle 24, on which is journalled the middle hub 21a of a crawler reach. The upper hubs 23a of the hangers are tied by an engaging cross-shaft 25 passing through the sills above the trap-doors, and rigidly secured to said hubs, as by pins 23b. The cross-shaft serves to prevent bulging, collapse, or twisting of the main frame, and might be dispensed with if the frame were stiff enough without it.

In practice no great importance is attached to the length of these hangers, except that they lift the body a reasonable height above the ground. In substantially all work to which the dump wagon may be applied it is desirable to scrape off and level the top of the dumped load in the forward movement of the wagon, since in nearly every case the dump must be further spread and leveled anyhow. The body is therefore made to carry a load which when dumped extends a very considerable distance above the sills, as illustrated by the dotted heap in Fig. 8. When the wagon is dragged forwardly after the discharge of the load, a part of the crown of the heap is scraped forwardly by the cross-shaft, and the residue down to the level of the bottom of the sills, is similarly scraped off and spread forwardly by the straight bottom of the rear sill. This gain in the spreading of the heap involves no difficulty, since the crawlers run easily, as above noted, and the tractor of the designated type supplies abundant power.

In this connection the special mounting of the trap-doors and their functioning in clearing a dumped load are to be noted. By reference to Fig. 8 it will be seen that the outer edges of the trap-doors are held by their suspending chains within the enclosing frame and slightly above the bottom thereof, consequently the outer edge of each door cannot escape from the frame enclosure, whether up or down. At the same time the suspending chains allow much freedom of movement of the doors, which is of advantage in clearing the heap of material dropped from the wagon, or even obstructions not connected with the heap. Thus a rock in the path of the door, as shown in Fig. 1, or heaped up material, as in Fig. 8, would only push the door upwardly and permit it to tilt endwise or sidewise so as to clear the obstruction.

As above noted, the wagon is made to be drawn by a tractor of the track-laying type. A portion of the rear end of the tractor 26 is shown in Fig. 1. It is understood to be supplied with oil-pressure mechanism not shown, and adapted to serve this pressure oil through a flexible hose 27 to a hydraulic hoist mounted on the forward part of the wagon. The support for the hoist is a tongue 28 mounted in the angle between the forward inclined end of the wagon body and the front cross-sill. Its rear end is between and attached to inclined angle-bars 29 secured to the wagon body. (See Figs. 1 and 9.) It is also attached to bracing angles 30 and 31 secured to the cross-sill. It is made as a hollow structure, as best shown in Fig. 6, formed of steel plates electrically welded together. Between the front and rear plates 28a and 28b of its depending nose, tubes 32 are set to receive at either level the shank of a draft coupling 33. (See Fig. 9.) This coupling has a forked jaw 34 to carry a toggle 35 engaging the tractor draft apparatus 36. A strong coil spring 37 serves to relieve both the tractor and the wagon from sudden shocks in their movement from place to place.

On the top of this tongue is mounted a hydraulic hoist with feet 38 and 39 securely bolted thereto. To the gear-case 40 is attached a cylinder 41 whose outer head connects by a service pipe 42 with the flexible hose above mentioned. A piston 43 connects with a piston-rod 44, one side of which is formed as a gear rack 45. The rack engages a spur gear 46 carried by a cross-shaft 47 set in bearings at each side of the gear-case. The free end of the piston rod passes through an abutment 48 formed in the gear case, and is provided with a coil spring 49 set between two collars 50, the outer one held by a terminal nut 51 and the inner one slidable upon the rod. This spring absorbs the shock of a sudden recoil when on a release of the hoist, as will be explained presently, the piston retreats to its initial position, as shown in Fig. 6. A protective pipe 52 covers this portion of the piston rod and its connections, and shields it from dirt and injury, the pipe cap 52a being perforated for the escape of air.

To the ends of the cross-shaft are attached drums for hoisting cables 53 for raising the respective dump doors as described below, one of them, 54 being a simple drum with side flanges, and the other a combined drum 55 and ratchet 56. A bracket 40a at the top of the gear-case carries a depending and swingable gravity arm 57, with an angled extension 57a. (See Figs. 9 and 10.) To this is attached a pull-cord 58 running over a sheave 59 and extending forward to the cab of the pulling tractor. In an opening between the sides of this arm 57 is hung a gravity pawl 60 to engage the ratchet 56. The tilting of the pawl is limited by the contact of its heel 60a with an intercepting shoulder 57b of the arm. In the engaging position, as shown in Fig. 9 the contact of the pawl with the ratchet tooth is practically in line between the point of suspension of the arm and that of the pawl, giving a locked position to hold the ratchet and drum from turning, but one requiring but a slight strain on the pull-cord to release. The movement of the pendulum arm towards the ratchet is limited by the contact of a hump 57c with the periphery of the drum. When the pendulum arm is drawn back, as shown in Fig. 10, though the pawl may still be in contact with the ratchet, it yields and there is nothing to obstruct the swift whirl of the drum, or cause a breakage of any of the parts, however carelessly the trip may have been executed.

It is preferred normally to sustain the whole load on the dump doors by the ratchet and pawl trip mechanism above described. While it would be possible to support the load by the hydraulic hoist alone, the dumping would be slow if dependent on the back-up of the hydraulic piston, and it is desirable that the load be dumped very quickly. The weight of the load necessarily puts a heavy strain on the ratchet and pawl, and a pawl of the ordinary type would be hard to disengage, as well as liable to cause breakage.

The support for the inner edges of the trap-doors is in the nature of a pair of slings formed by the two stretched steel cables 53 above mentioned, passing under the trap-doors. (See Figs. 1, 2 and 3.) At the rear each cable is securely anchored to the cross-sill by a stirrup 62. Thence the cables pass under sheaves 63 at the rear and back ends of the inner edges of the respective doors and between longitudinal angle-bars 64, which serve as supports for the sheaves and stiffeners for the doors, over sheaves 65 mounted on the front sills, and are finally connected at their front ends to the drums above described. Disengagement of the cables is prevented by loops 66. The cables necessarily swing outwardly with the doors when the load is dumped, and this would tend to force a hard side strain on the sheaves 65 when the action of the hoist draws the cables taut in restoring the doors to load-supporting position. Transversely disposed sheaves 67 are accordingly placed below the sheaves 65 to deflect the cables and allow them to run easily and freely on the latter sheaves. To give the requisite stiffness to the trap-doors cross-wise they are provided with reinforcing ribs 68.

To lift the trap-doors to the load-supporting position, pressure oil is admitted to the hydraulic cylinder by a valve 69 of the three-way type, accessible to the driver of the tractor, the movement of the piston revolving the drums to wind up the cables. At the limit of movement, the ratchet is caught by the pawl, with stretched cables held by the drums. The hydraulic hoist may then be released by another turn of the valve lever, and with the escape of the pressure oil there is nothing to obstruct the quick dumping of the load, as above set forth.

In Fig. 7 there is illustrated a modified hanger 23c formed as a fork to straddle the crawler. This secures an equal strain on both ends of the pivot-axle engaging the reach, thereby giving greater stability to the structure. It also admits of the crawlers being set nearer to the wagon body and narrowing their tread, which is sometimes advantageous. The figure also shows fragmentarily the straight-bottomed rear cross-sill, and its relation to the body and crawlers.

Having thus described my invention, I claim:

1. Combined with a wheeled dump-wagon having an open-bottomed body, a trap-door hung at a side of the opening, a cable anchored at one end past the door and traversing the door, wind-up mechanism connected to the free portion of the cable, a hydraulic jack, a rack and pinion connecting the jack with the wind-up mechanism, and detent mechanism for maintaining said wind-up mechanism in a predetermined position.

2. Combined with a wheeled dump-wagon having an open-bottomed body, a door to close the opening hung at a side thereof, a cable anchored at one end past the opening and traversing the door, wind-up mechanism connected to the free portion of said cable and positioned past the opposite end of the opening, a hydraulic jack, a rack and pinion connecting the jack with the wind-up mechanism, detent mechanism for holding said wind-up mechanism in a predetermined position and means adapted to cushion the backstroke of the rack on the release of the wind-up mechanism to dump the load.

ROY E. CHOATE.